US009866261B2

(12) United States Patent
Laurila

(10) Patent No.: US 9,866,261 B2
(45) Date of Patent: Jan. 9, 2018

(54) RF ANTENNA SWITCH AND METHOD OF OPERATING THE ANTENNA SWITCH

(71) Applicant: Snaptrack Inc., San Diego, CA (US)

(72) Inventor: Hannu Laurila, Oulu (FI)

(73) Assignee: SnapTrack, Inc., San Diego, CA (US)

( * ) Notice: Subject to any disclaimer, the term of this patent is extended or adjusted under 35 U.S.C. 154(b) by 0 days.

(21) Appl. No.: 15/038,096

(22) PCT Filed: Nov. 22, 2013

(86) PCT No.: PCT/EP2013/074493
§ 371 (c)(1),
(2) Date: May 20, 2016

(87) PCT Pub. No.: WO2015/074713
PCT Pub. Date: May 28, 2015

(65) Prior Publication Data
US 2016/0294435 A1    Oct. 6, 2016

(51) Int. Cl.
*H04B 1/44* (2006.01)
*H04B 1/04* (2006.01)

(52) U.S. Cl.
CPC ............. *H04B 1/44* (2013.01); *H04B 1/0475* (2013.01); *H04B 1/0483* (2013.01)

(58) Field of Classification Search
CPC .................................................. H04B 7/0602
See application file for complete search history.

(56) References Cited

U.S. PATENT DOCUMENTS

| 7,187,945 | B2 * | 3/2007 | Ranta | H03J 5/244 |
| | | | | 455/552.1 |
| 7,996,003 | B2 * | 8/2011 | Maeda | H04B 1/30 |
| | | | | 455/115.1 |
| 9,143,208 | B2 * | 9/2015 | Khlat | H04B 7/0404 |
| 9,288,031 | B2 * | 3/2016 | Rousu | H04B 1/006 |

(Continued)

FOREIGN PATENT DOCUMENTS

| WO | WO-2010024376 A1 | 3/2010 |
| WO | WO-2013125363 A1 | 8/2013 |

OTHER PUBLICATIONS

International Search Report and Written Opinion—PCT/EP2013/074493—ISA/EPO—dated Jul. 1, 2014.

*Primary Examiner* — Cindy Trandai
(74) *Attorney, Agent, or Firm* — Patterson & Sheridan, L.L.P.

(57) ABSTRACT

An RF antenna switch and a method for operating the antenna switch are disclosed. In an embodiment the antenna switch includes an antenna terminal and a switch including a number of n I/O terminals and n−x transceiver units, wherein each transceiver unit is configured to operate in a frequency band of a respective communication system, and wherein n and x are integers and n, x≥1 and n>x. The switch is further adapted to independently connect a plurality of the I/O terminals to the antenna terminal to provide a respective signal paths from the antenna terminal to the I/O terminals, wherein a first filter is connected between a first I/O terminal and a common input node of a first transceiver unit, the first filter being adapted to filter out an unwanted harmonic mode produced by a transmitter of the first transceiver unit.

11 Claims, 5 Drawing Sheets

(56) References Cited

U.S. PATENT DOCUMENTS

| | | | |
|---|---|---|---|
| 2005/0277387 A1* | 12/2005 | Kojima | H01Q 1/241 |
| | | | 455/78 |
| 2007/0085754 A1* | 4/2007 | Ella | H01Q 23/00 |
| | | | 343/862 |
| 2013/0217343 A1* | 8/2013 | Tenbroek | H04W 24/00 |
| | | | 455/77 |
| 2013/0241666 A1* | 9/2013 | Granger-Jones | H01P 1/15 |
| | | | 333/101 |
| 2013/0250819 A1* | 9/2013 | Khlat | H04B 1/10 |
| | | | 370/278 |
| 2014/0015731 A1* | 1/2014 | Khlat | H01H 1/0036 |
| | | | 343/876 |
| 2014/0055210 A1* | 2/2014 | Black | H04B 1/525 |
| | | | 333/132 |
| 2014/0092795 A1* | 4/2014 | Granger-Jones | H04L 5/08 |
| | | | 370/297 |
| 2014/0349720 A1 | 11/2014 | Uejima et al. | |
| 2015/0133067 A1* | 5/2015 | Chang | H04B 1/48 |
| | | | 455/78 |

* cited by examiner

RF ANTENNA SWITCH AND METHOD OF OPERATING THE ANTENNA SWITCH

This patent application is a national phase filing under section 371 of PCT/EP2013/074493, filed Nov. 22, 2013 which is incorporated herein by reference in its entirety.

TECHNICAL FIELD

The application relates to an RF antenna switch and a method of operating the antenna switch. The switch may be used in frontend modules of mobile communication systems as well as in base stations and other wireless communication devices.

BACKGROUND

Modern communication standards and systems use a carrier aggregation mode for enhancing the bandwidth of the data transfer. Carrier aggregation mode means operating in a first communication system including transmitting and receiving data or other signals and at least receiving signals in another communication system or in another band. Carrier aggregation interoperability or functionality needs to be incorporated in modern devices. International standards are defining a couple of band combinations that may be used for carrier aggregation mode operation. Some of these band combinations cause problems and need additional filtering to attenuate a certain harmonic mode of a frequency, the harmonic mode appearing in the second band of the band combination and producing noise signals. However, additional filtering usually causes additional losses, which is not desirable.

SUMMARY OF THE INVENTION

Embodiments provide a solution for this problem, allowing to filter out noise frequencies arising from harmonic modes without producing too much loss.

Embodiments of the invention proposes to implement an additional filter within the signal line and to provide a switching possibility to switch between a signal route through the filter and a further signal route to bypass the filter. This enables to filter out the disturbing frequencies when operating in a carrier aggregation mode. On the other hand, when using the switch for a single band operation mode, the additional filter can be bypassed such that no additional loss arises.

This additional switching possibility needs an additional I/O terminal at the switch. Starting from a specific module design as known in the art, a switch has to be designed to provide an additional I/O terminal to enable an additional signal path through the filter. In an embodiment the RF antenna switch comprises an antenna terminal and a number of n I/O terminals that are used to connect a desired number of transceiver units to the I/O terminals, each of the transceiver units operating in a respective frequency band of a respective communication system. The number of transceiver units is advantageously n−x where n or x are ≥1 and n>x. This means that the switch comprises x I/O terminals that can be used for purposes other than switching between different transceiver units or between transceiver units for different bands. In this connection "connecting" has to be understood to mean directly connecting via a conductor line or indirectly coupling via a coupling element that can be implemented in the signal path.

The switch is adapted to independently connect one or more of the I/O terminals at the same time to the antenna terminal to provide respective signal paths from the antenna terminal to the I/O terminal. According to the invention, the switch further comprises a first filter connected between a first I/O terminal and a first transceiver unit. The filter is adapted to filter out an unwanted harmonic mode that may be produced by the transmitter of the first transceiver unit. Via a second I/O terminal the antenna terminal may be connected to the first transceiver unit thereby bypassing the filter. Hence, the first filter connected to the first I/O terminal can be switched on or off and the signal can be routed through the filter or routed the other way bypassing the filter. In this connection and in the following first, second or another numbering assigned to an element is only used to differentiate between the elements. An $n^{th}$ element does not require the presence of n−1 other elements.

In an embodiment of the invention the shunt path of the I/O terminal is used to route the unwanted and disturbing frequency through the filter to ground. This shunt path is the normal termination of the I/O terminal when it is not connected to the antenna terminal.

At least the first and a second I/O terminal are connectable to a common input node of the first transceiver unit. Then, this embodiment is adapted to provide a first and a second switching position to switch between additional filtering and normal routing without filtering.

In the first switching position, the signal path between the antenna terminal and the first I/O terminal is disconnected and the signal path between the antenna terminal and the second I/O terminal is actively connected to the antenna terminal. Thereby the in the signal path to the first transceiver unit is connected to the first I/O terminal via the first filter. The common input node is further connected to the second I/O terminal and, thus, via the switch to the antenna terminal.

In the second switching position both signal paths between the antenna terminal and the first and second I/O terminal are active such that the antenna terminal is connected directly to the common input node and the first filter is disconnected from the shunt path of the first I/O terminal.

In the first switching position of this embodiment the unwanted frequency can be filtered out by connecting the filter output to the shunt path of the first I/O terminal that the unwanted signal may be guided to ground. This means that the filter must let the unwanted signal pass and block the wanted signals regularly generated by the first transceiver unit to avoid shunting the regular signals. These regular frequencies are guided from the transceiver unit and the common node over the second I/O terminal to the antenna terminal. The unwanted signals are guided from the common node to the filter and from the filter output to the first I/O terminal and then over the shunt path to ground.

The first filter can be embodied in a simple manner as only a small attenuation is necessary. Hence, in an embodiment the first filter comprises LC elements that are circuited to form a parallel resonance circuit or a series resonance circuit. These LC elements can be embodied as integrated elements in a multilayer PCB or in a multilayer carrier substrate onto which the antenna switch is mounted. Alternatively, the LC elements can be embodied as discrete elements that are mounted on top of a board on which the antenna switch is mounted. It is also possible to use a filter whose LC filter elements comprise integrated elements as well as discrete elements.

In a preferred embodiment the LC elements are integrated in a multilayer board that may be an LTCC board (LTCC=low temperature co-fired ceramics). L-elements are formed as inductive elements comprising conductor sections that may be arranged to form at least half a winding or a spiral. Depending on the frequency straight conductor sections may have an inductivity that can be used to manufacture an LC filter element therefrom. A C-element can be realized as a capacitor using metallized areas that are preferably arranged in different planes of the multilayer board. The two capacitor plates can also be arranged in the same metallization plane of the board by arranging two metallized areas directly adjacent to each other.

In an embodiment the filter used in the antenna switch is a notch filter designed to block the undesired frequency and to let pass the operating frequency of the first transceiver. A notch filter may be produced from reactance elements arranged in a ladder-type or a lattice-type configuration.

In another embodiment the filter is a band pass filter or a low pass filter. These two types are preferred for the embodiment where the first filter is connected between the common node and the first I/O terminal that can be connected to the shunt path of the I/O terminal. A high pass filter can be used as the undesired and disturbing frequency is usually higher than the operating frequency of the first transceiver unit and can thus pass the high pass filter while the operating frequency is blocked and is stopped by the high pass filter.

In an embodiment the antenna switch is adapted to operate in carrier aggregation mode. This needs connecting at the same time a first transceiver unit operable in a first frequency band and a second transceiver unit operable in a second frequency band according to a second communication system to the antenna terminal via a respective I/O terminal and a respective signal path.

In the carrier aggregation mode both signal paths are active and the system operates in the first and the second communication system simultaneously.

If the transmitter of the first communication system produces a harmonic mode and if this harmonic mode has a frequency that is situated in a used band of the second communication system the signals according to the harmonic mode are filtered out by setting the switch to the second switching position. Then, this unwanted frequency of the harmonic mode of the first communication system is effectively filtered out by the first filter.

An exemplary band combination that is provided for carrier aggregation mode is the combination of band 4 (B4) and band 17 (B17). Band B17 produces a third harmonic at a frequency just inside the RX part of the B4 band. Hence the filter is adjusted to filter out the frequency that lies between 2,110 to 2,155 MHz.

Another example of an allowed band combination assigned for carrier aggregation mode is a combination of band B3 and band B8. There too, the higher one of the two bands is disturbed by a higher mode of the transmitter operating in the band having a lower frequency. A second harmonic mode produced by the band B8 transmitter in the first transceiver has a frequency just within the RX part of band B3. In this example the first filter is optimized to filter out the frequency of this second harmonic of the B8 transceiver. For doing this, a first filter is needed with a stop band at least in the overlap area of the harmonic and the second (Rx) band. In this example the Tx band of band B8 is from 880 to 915 MHz. A harmonic mode arises at twice the basic frequency that is from 1760 to 1830 MHz. Band B3 having an Rx band from 1805 to 1880 MHz overlaps with the harmonic mode of Tx of B8.

In a further embodiment of the invention, a first and a second filter are connected to respective exceeding I/O terminals of the antenna switch to provide filtering means for disturbing harmonic frequencies of two carrier aggregation mode band combinations. There may also be further carrier aggregation band combinations that do not need additional filtering as there are no disturbing harmonic modes apparent in a band of these band combinations. Further, single I/O terminals are provided that are assigned to be exclusively connectable with a respective transceiver unit or with only the receiver unit of a respective communication system that is a radio system. These communication systems may operate in a single band operation mode or in a carrier aggregation operation mode. The number n of terminals depends on the number n−x of different communication systems to be connected to the antenna switch. The number x corresponds to the number of exceeding I/O terminals that can be assigned for switchably connecting an additional filter to the antenna switch.

In an embodiment the antenna switch comprises two antenna terminals. In this case the switch is adapted to connect the first and/or the second antenna terminal to one of the I/O terminals. The second antenna terminal can be connected to a second antenna which may be a diversity antenna.

It is possible that a first antenna terminal connected to a first antenna terminal is assigned to low band operation while the second antenna terminal connected to the second antenna terminal is assigned to high band operation. Low band operation comprises communication systems or radio systems operating at a frequency below about 1,400 MHz. The high band comprises frequencies above this value up to about 2.5 GHz or more.

Providing two antenna terminals and two antennas assigned to low band and high band operation allows the optimization of the antenna to the respective frequency range. This means that the antenna is matched to the respective frequency range. Providing a first antenna and a second antenna that is a diversity antenna has the advantage that simultaneous operation in two communication systems is possible if one communication system is connected with the first antenna and the second communication system is connected to the second antenna.

In an embodiment, the switch is part of a frontend module that can operate in a carrier aggregation mode that allows operating simultaneously in two different bands according to a first and a second communication system. In this case the switch comprises a first and a second antenna terminal connectable via an I/O terminal and the respective signal path to one of the first and a second transceiver unit respectively, the first and a second transceiver unit are operating in different bands.

Single band operation is possible in each of the two bands by actively connecting a selected one of the transceiver units to a respective antenna terminal.

Carrier aggregation mode operation is possible needing connecting the first filter between the shunt path of the first I/O terminal and the first transceiver unit connecting the first transceiver unit to the first antenna terminal via the second I/O terminal and the respective signal path connecting the second transceiver unit to the second antenna terminal via a third I/O terminal and the respective signal path.

In an embodiment of antenna switch the number x is set to x≥2 such that the number n of I/O terminals exceeds the number of connectable transceiver units by two or more. At least a first, a second a third and a fourth transceiver unit are provided. Then, a first filter can be connected between the first transceiver unit and the first I/O terminal. At least a second filter can be connected between the fourth I/O terminal and the third transceiver unit according to a third communication system. In this case, a third switching position of the antenna switch exist where the fourth I/O terminal is connected to its shunt path, the third transceiver unit is actively connected to the first antenna terminal via a fifth I/O terminal, and the fourth transceiver unit is actively connected to the second antenna terminal via a sixth I/O terminal.

Then, a harmonic mode formed by the transmitter of the third transceiver unit is filtered out by the second filter and connected to ground via said shunt path. This harmonic mode has a frequency in the band of the fourth transceiver unit assigned to operate simultaneously with the third transceiver unit.

The second filter can be directly connected to the antenna terminal via the fourth I/O terminal and respective signal path for allowing single band operation in the third band only when the third transceiver unit is actively connected to the first antenna terminal via the fifth I/O terminal.

In a further embodiment of the invention a method for operating a frontend module comprising a switch according to the invention is disclosed. The method comprises switching the antenna switch into a first switching position when operation of the frontend module in a carrier aggregation mode is desired. In this first switching position, the following connections have to be made: the signal path between the antenna terminal and the first I/O terminal is disconnected, thereby connecting the common input node to the shunt path of the first I/O terminal via the filter; the signal path between the antenna terminal and the second I/O terminal is active; the first transceiver unit is actively connected to the second I/O terminal, and the second transceiver unit is connected actively to the second antenna terminal via the third I/O terminal.

The method further comprises switching the antenna switch into the second switching position when operating in a single band operation mode only is desired. In the second switching position, the signal paths between the antenna terminal and the first and second I/O terminals are active and the signal path between the second transceiver unit and the antenna terminal is disconnected.

The method can comprise a fifth switching position allowing operating in a carrier aggregation mode without additional filtering where the switch is set to a position in which the signal paths between an antenna terminal and the first, second and third I/O terminals are active. This fifth switching position can be used for carrier aggregation mode without additional filtering.

BRIEF DESCRIPTION OF THE DRAWINGS

The invention is explained in more detail with reference to embodiments and the according figures. The figures are schematic and, for a better understanding of the invention only, are not drawn to scale. Hence, neither relative nor absolute values can be taken from the figures. According parts and features or parts having the same function are assigned the same reference symbol.

DETAILED DESCRIPTION OF ILLUSTRATIVE EMBODIMENTS

FIG. 1 schematically shows the switch SW according to the invention. The switch may be construed of field-effect transistors in a gallium arsenide technology or a circuit of pin diodes on silicon base or another switch on another semiconductor technology. The switch comprises at least one antenna terminal AT and a number n of I/O terminals IO. The switch can independently connect the antenna terminal AT to one or more of the I/O terminals IO.

When a signal path SIP between antenna terminal and I/O terminal is disconnected the respective I/O terminal is connected to a shunt path SHP. The shunt path SHP may be the ground connection of the respective transistor and comprises a resistive element R. In the case the switch is a FET the resistive element R in the shunt path SHP stand for FET channel resistance. In other embodiments the resistive element R may be inductive too.

In the figure, four I/O terminals IO1, IO2, IOX and IOn are shown. I/O terminal IO1 is connected to the common input mode NOD of the first transceiver unit TRU1 via the filter FIL. The I/O terminal IO2 is connected to the same input node IOT via a signal line. The remaining I/O terminals are connected to a second and third transceiver unit via respective signal lines.

Figure 1A:
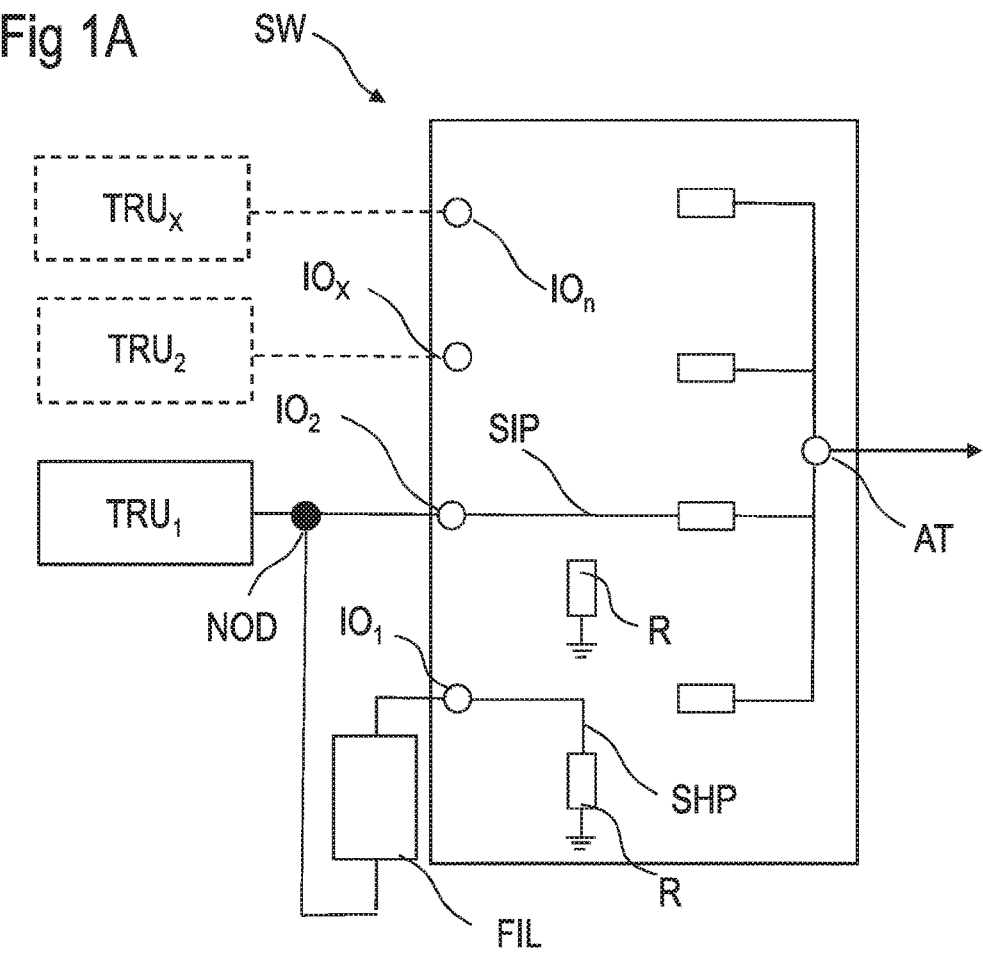
FIG. 1A shows an antenna switch in a first switching position.

FIG. 1A shows the antenna switch SW in a first switching position that allows filtering out an unwanted by the filtering FIL. The unwanted frequency can pass the filter FIL towards the first I/O terminal IO1 that is connected to a shunt path SHP and then conducted to ground. For all other frequencies below the unwanted frequency the signal is conducted between the antenna terminal and the common node via the signal path SIP and the second I/O terminal IO2. The common node is connected to the first transceiver unit TRU1.

Figure 1B:
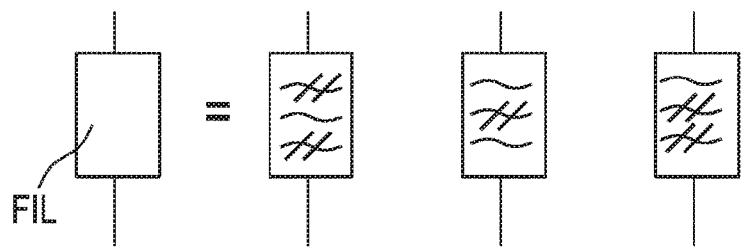
FIG. 1B shows different filters that may be used.

FIG. 1B shows three types of filters that may be used for an antenna switch according to the invention. The filter FIL may be embodied as a band pass filter, a notch filter or a high pass filter. All of these types of filters ensure that unwanted signals in a frequency range that is used by an aggregated other communication system can pass the filter FIL. Signals having a frequency inside the band used by the first communication system are blocked by the filter FIL. All frequencies that can pass the filter FIL are shunted to ground via the first I/O terminal and the shunt path SHP.

Figure 1C:
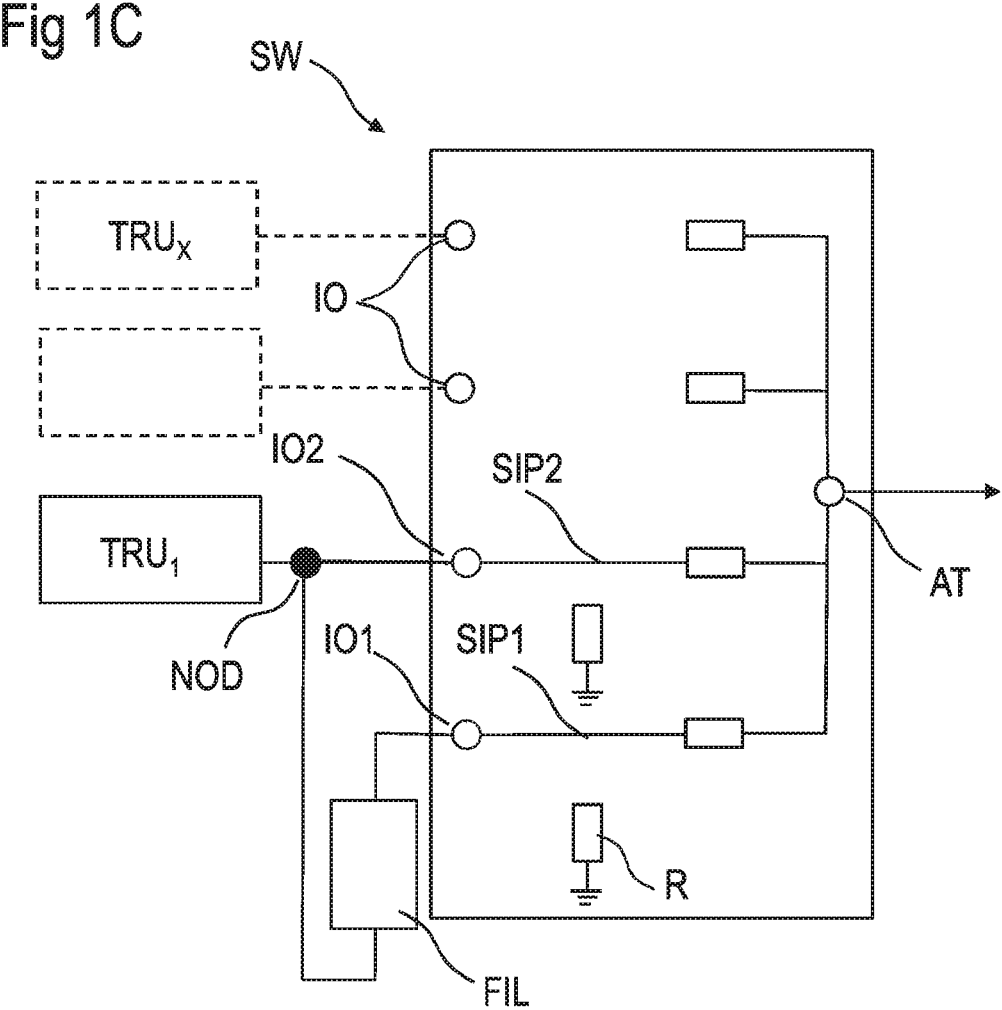
FIG. 1C shows the antenna switch in a second switching position.

FIG. 1C shows the antenna switch SW in a second switching position that allows bypassing the filter FIL. In contrast to the first switching position shown in FIG. 1A, the first signal path SIP1 now actively connects the first I/O terminal to the antenna terminal AT. Hence, there is no connection to ground for this signal path and all signals belonging to the band of the first communication systems are guided via the second signal path SIP2 from antenna terminal AT over second I/O terminal IO2 to the first transceiver unit TRU1. This means that the first signal path SIP1 is totally in parallel to the second signal path SIP2 and has practically no influence on the signal.

Figure 1D:
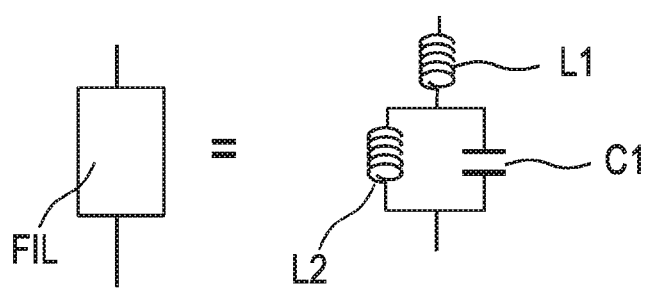
FIG. 1D shows a filter construed from LC filter elements.

FIG. 1D shows a special embodiment of a filter circuit FIL that can be used in connection with the antenna switch according to the invention. The filter FIL can be embodied as an LC filter construed from LC components, the filter can be a parallel resonance circuit formed by a parallel capacitance C1 and a parallel inductance L2. An additional series resonance circuit is formed by the first inductance L1 and the first capacitance C1. The values of the LC elements are selected to provide a resonance at a disturbing frequency that is higher than the frequency of the used band according to the first transceiver unit TRU1.

Figure 2:
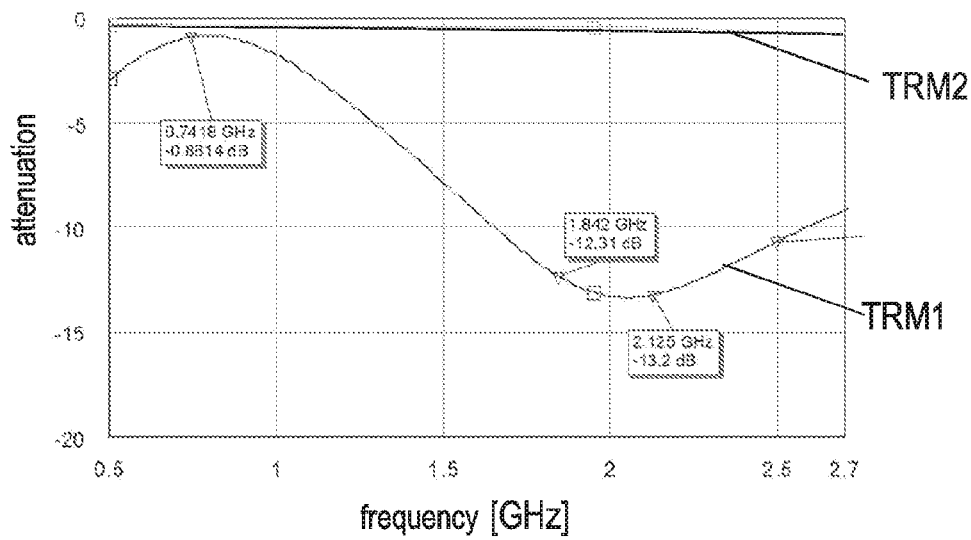
FIG. 2 shows the frequency response of a first communication system after additional filtering.

FIG. 2 shows the frequency response TRM of a frontend module adapted to allow carrier band aggregation of band 4 and band 17 with and without additional filtering. An antenna switch according to FIGS. 1A and 1C is used. The respective filter FIL is construed according to FIG. 1D. Following LC elements are used for this embodiment and the respective band combination: L1, L3=1 nH and C1=1 pF.

Band 17 is a low band, around 750 MHz, while band 4 is a high band around 2.1 GHz. In the diagram, first and second transition modes TRM1 and TRM2 are shown. Both transition modes are calculated for a frontend module that comprises an antenna switch according to the invention. The depicted transmission modes show a signal transmission between antenna terminal AT and common node NOD of the first transceiver unit TRU1 according to band 17. The first transition mode TRM1 of the carrier aggregation mode accords to the first switching position and shows a little loss effect within band 17 due to the additional filtering but shows a reasonable attenuation up to −13 dB in the frequency range of band 4. This means the disturbing frequencies in the B4 band can be effectively filtered out by the frontend module using an antenna switch comprising an additional filter FIL.

The second transition mode TRM2 accords to the second switching position of the same frontend module and shows very low insertion loss at low band frequencies of band 17 as well as a low insertion loss in high band frequencies of band 4, for example. This shows that there is no negative influence of the additional filter when the additional filter FIL is bypassed according to the second switching position.

Figure 3:
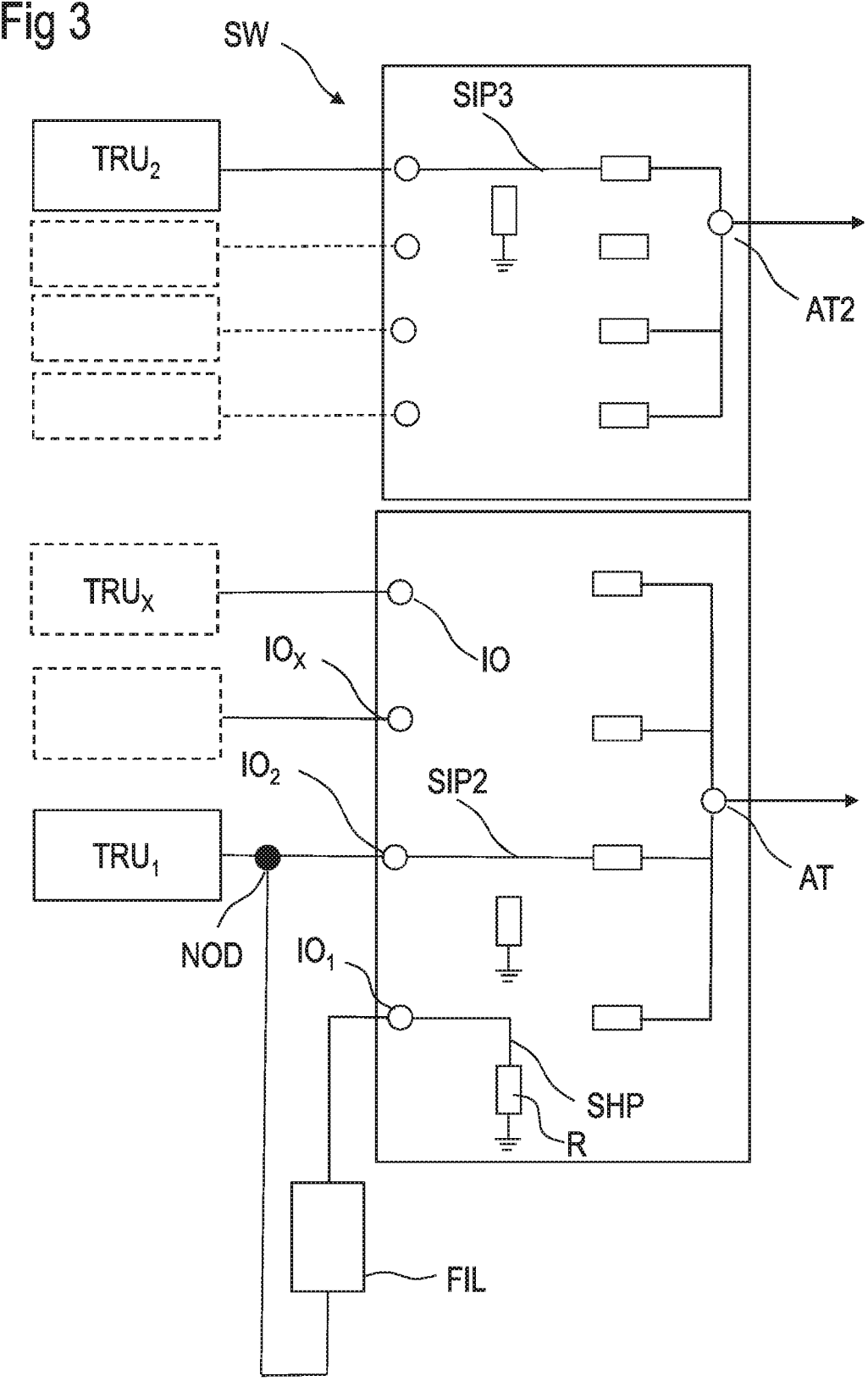
FIG. 3 shows an antenna switch with two antenna terminals in a switching position that allows carrier aggregation mode operation.

FIG. 3 shows an antenna switch comprising a first and a second antenna terminal AT. The second antenna terminal AT2 can be selectively connected by the switch with one or more I/O terminals that are connectable to transceiver units according to respective communication systems. The communication systems may use different bands. The bands the switch is operable in may be apart from each other, adjacent to each other or may have an overlap in frequency.

The switch is shown in the first switching position where the filter FIL is active, allowing to conduct a disturbing frequency produced by the transmitter of the first transceiver unit TRU1 via the shunt path SHP to ground. Second signal path SIP2 connects the antenna terminal AT with the first transceiver unit. Third signal path SIP3 connects the second antenna terminal AT2 with a second transceiver unit TRU2. First transceiver unit TRU1 may be assigned to a first communication system while second transceiver unit TRU2 may be assigned to a second communication system, where both communication systems are provided for operation in carrier aggregation mode. First and second communication system may be a band 4/band 17 combination or a band 3/band 8 combination where additional filtering by the filter FIL is advantageous to filter out disturbing harmonic modes produced by the transmitter of the first communication systems.

Figure 4:
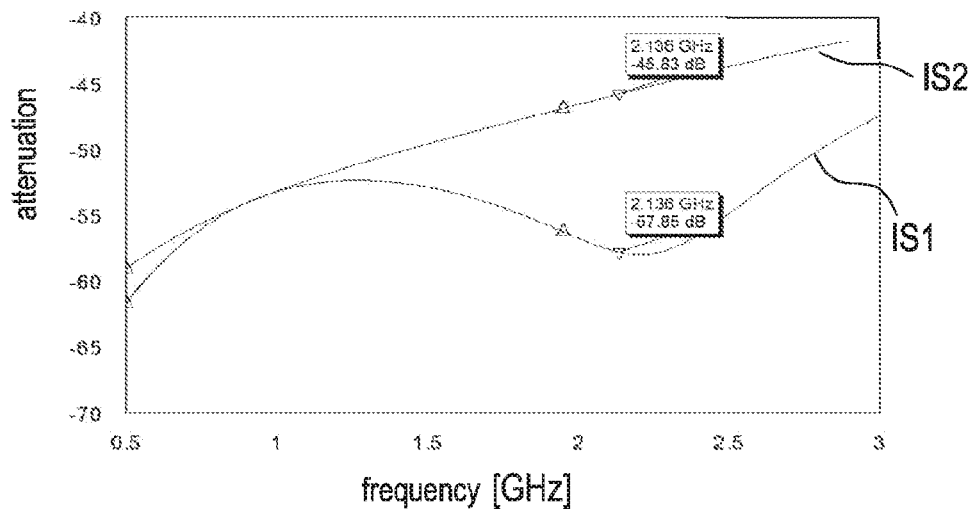
FIG. 4 shows the isolation between two bands in a carrier aggregation mode with and without additional filtering.

FIG. 4 shows the isolation between band 4 and band 17 in carrier aggregation operation mode. Two graphs IS1 and IS2 are shown where the first graph IS1 accords to the first switching position as shown in FIG. 3. The second graph IS2 shows the isolation measured without additional filtering according to the second switching position. The figure shows that according to the invention and the additional filtering in the first switching position the isolation between both bands at the band 4 frequencies is improved by about 12 dB. Hence, disturbing frequencies in band 4 can be effectively filtered out.

Figure 5:
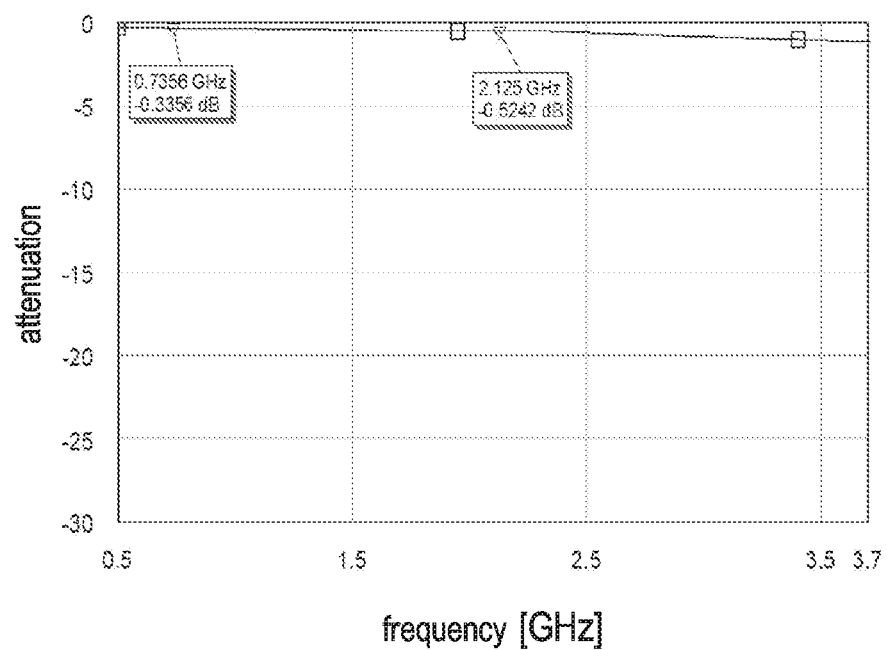
FIG. 5 shows the frequency response of the first transceiver unit in a single band operation where the additional filter is bypassed.

FIG. 5 shows the transmission of the signal path for band 17 through an inventive switch that is set to the second switching position and accords with the graph TRM2 shown in FIG. 2. The measured values at band 17 and band 4 frequencies are depicted and provide evidence for the very low insertion loss given by the antenna switch of the invention.

The invention has been explained with reference to specific embodiments as shown in the figures. However, the invention is not restricted to these embodiments or to these figures. For example the number of I/O terminals and communication systems connectable to the switch may be chosen as necessary for a desired frontend module. The switch can be realized to connect one, two or more antenna terminals to a number of I/O terminals. The positive effect of the invention has been shown for two band combinations but is not restricted to the disclosed band combinations. Basic for all embodiments is an additional filtering that can be switched on and off by using an exceeding I/O terminal that is coupled to a filter and can be switch on and off in respective switching positions of the antenna switch. The invention is not restricted to filter out a harmonic mode of a band but is intended to filter out a desired frequency that otherwise would disturb operation in any band a respective module is operating in.

The invention claimed is:

1. An apparatus comprising:
   an antenna terminal;
   a switch comprising a number of n I/O terminals; and
   n−x transceiver units, wherein each transceiver unit is configured to operate in a frequency band of a respective communication system, and wherein n and x are integers and n, x≥1 and n>x,
   wherein the switch is adapted to independently connect a plurality of the I/O terminals to the antenna terminal to provide respective signal paths from the antenna terminal to the I/O terminals,
   wherein a filter is connected between a first I/O terminal of the I/O terminals and a common input node of a first transceiver unit of the transceiver units, the filter being adapted to filter out an unwanted harmonic mode produced by a transmitter of the first transceiver unit, and
   wherein the common input node of the first transceiver unit is connected to a second I/O terminal of the I/O terminals.

2. The apparatus of claim 1, wherein each of the I/O terminals is connected to ground via a shunt path when a respective signal path from the antenna terminal to the I/O terminal is not active.

3. The apparatus of claim 2, wherein, in a first switching position, a signal path between the antenna terminal and the first I/O terminal is disconnected and a signal path between the antenna terminal and the second I/O terminal is active thereby connecting the common input node to the shunt path of the first I/O terminal via the first filter, and wherein, in a second switching position, both signal paths between the antenna terminal and first and second I/O terminals are active such that the antenna terminal is directly connected to the common input node and the first filter is disconnected from the shunt path of the first I/O terminal.

4. The apparatus of claim 3, wherein, in the first switching position, a second transceiver unit, configured to operate in a second frequency band according to a second communication system, at the same time is actively connected to the antenna terminal via a third I/O terminal and signal path, and wherein the second frequency band comprises a frequency of a harmonic mode of the transmitter of the first transceiver unit that would disturb operation in the second frequency band if not filtered out by the first filter.

5. The apparatus of claim 4, wherein the first transceiver unit is operable in band 17 and the second transceiver unit is operable in band 4.

6. The apparatus of claim 4, wherein the first transceiver unit is operable in band 8 and the second transceiver unit is operable in band 3.

7. The apparatus of claim 4, wherein the apparatus is part of a frontend module operable in a carrier aggregation mode with simultaneous operations in two different bands according to first and second communication systems, wherein the first and second transceiver unit are provided for the first and second communication system respectively, and wherein the switch comprises a second antenna terminal connectable via an I/O terminal and the respective signal path respectively to one of the first and second transceiver unit.

8. The apparatus of claim 1, wherein the first filter comprises LC filter elements that are circuited to form a parallel resonance circuit or a series resonance circuit.

9. The apparatus of claim 1, wherein the first filter is a notch filter.

10. The apparatus of claim 1, wherein the first filter is a band pass filter or a high pass filter.

11. A method for operating a frontend module comprising an apparatus according to claim 1, wherein, for operating in a carrier aggregation mode, the switch is switched into a switching position such that a signal path between the antenna terminal and the first I/O terminal is disconnected thereby connecting the common input node to a shunt path of the first I/O terminal via the filter, wherein a signal path between the antenna terminal and the second I/O terminal is active, wherein a second transceiver unit is connected actively to a second antenna terminal via a respective I/O terminal, and wherein for operating in a single band operation mode only the switch is switched into a second switching position such that the signal paths between the antenna terminal and the first and second I/O terminals are active and a signal path between the second transceiver unit and the antenna terminal is disconnected.

* * * * *